United States Patent [19]

Stafford

[11] Patent Number: 5,042,713
[45] Date of Patent: Aug. 27, 1991

[54] RE-USABLE SHIPPING CONTAINER
[75] Inventor: Ronald T. Stafford, Phoenix, Ariz.
[73] Assignee: Kiva Container, Inc., Phoenix, Ariz.
[21] Appl. No.: 618,085
[22] Filed: Nov. 26, 1990
[51] Int. Cl.$^5$ .............................................. B65D 13/00
[52] U.S. Cl. ................................ 229/23 R; 229/198.2; 229/DIG. 2; 229/DIG. 4; 220/441
[58] Field of Search ................... 229/DIG. 2, DIG. 4, 229/198.2, 23 R; 220/444

[56]  References Cited
U.S. PATENT DOCUMENTS 3,254,827  6/1966  Chapman ...................... 229/198.2
4,572,425  2/1986  Russell ............................. 229/155

FOREIGN PATENT DOCUMENTS 1568508  5/1980  United Kingdom ............. 229/23 R
2164922  4/1986  United Kingdom ............. 229/23 R Primary Examiner—Stephen Marcus
Assistant Examiner—Christopher J. McDonald
Attorney, Agent, or Firm—LaValle D. Ptak

[57] ABSTRACT

A reusable shipping container is formed of corrugated plastic material and includes shallow, open-ended, rectangular boxes forming a bottom and a cover. The end walls and side walls of the container are formed of inner and outer sheets of corrugated plastic material in the shape of rectangular panels. The corrugations of the panels extend vertically when the container is assembled. A total of six panels form the box, two of the opposing panels form ends of the container, and on each side, two equal-sized panels are used. The panels for the sides each have a length which is less than the length of the end panels. Corrugated plastic hinge members permit the side panels to fold inwardly to overlie one another, between the first and second end panels, in a storage position of the container member; so that the container may be placed inside the base or the top for storage.

20 Claims, 1 Drawing Sheet

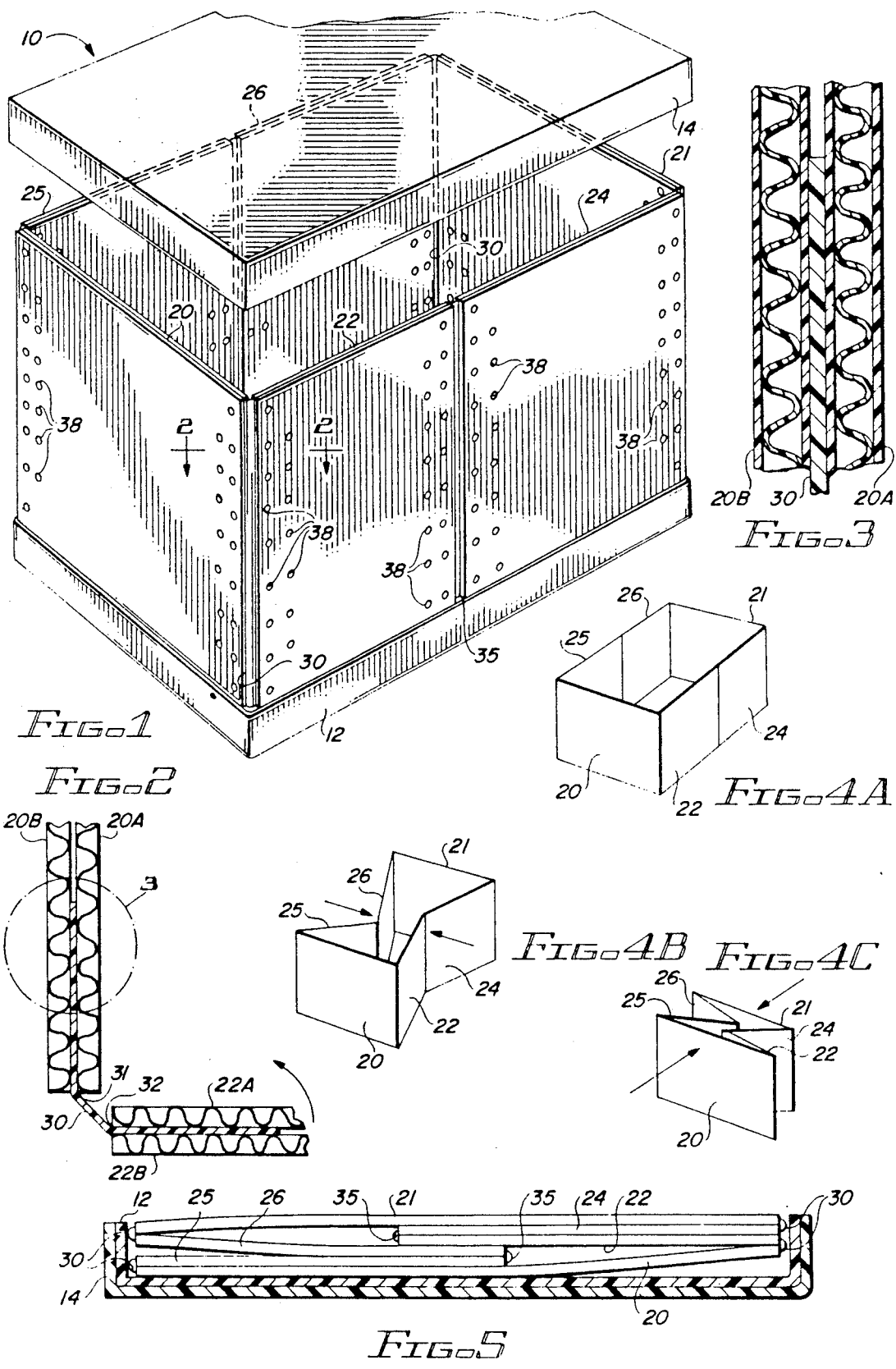

RE-USABLE SHIPPING CONTAINER

BACKGROUND

Shipping containers of many different types are used for protecting a variety of products transported from one location, typically a manufacturing plant, to another location. The type of materials used for such shipping containers varies considerably, depending upon the size of the item to be contained, the weight of the item being shipped, the means of transportation used, and the like. For heavy articles, wooden pallets and wooden shipping crates often are used. For long distance shipping, re-usable steel containers capable of holding a large number of articles, generally packed in smaller containers, frequently are used. For small, medium and some relatively large sized articles, corrugated cardboard or paperboard containers are in widespread use.

Corrugated cardboard shipping containers are relatively inexpensive, compared to other types of materials which can be used for boxes or containers and, typically, are designed for one-time use only. Once the product which is shipped in such a container reaches its final destination, the container is destroyed. For recipients of occasional articles packed in such corrugated cardboard containers, gosposal of the container normally can be accomplished without any great difficulty. Where products shipped in such containers, however, are received in large quantities, disposal of the shipping containers does constitute a significant problem.

A situation where the sheer bulk of large numbers of corrugated shipping containers constitutes a major waste disposal problem is in automobile assembly factories where, many of the parts to be assembled are fabricated in sub-assembly plants located at a distance from the assembly plant. The parts frequently are shipped in protective corrugated cardboard containers which must be broken down and disposed of at the receiving plant. The containers are quite bulky, large amounts of dust are created in flattening them down for disposal, and, finally, even though corrugated cardboard materials are "biodegradable," it has been found that when they are packed in landfills, relatively little deterioration takes place, even after many years.

Another problem which exists with corrugated cardboard shipping containers is that the container material (and therefore the contents) is relatively succeptable to damage from blows to the container walls. In addition, a limited number of filled corrugated cardboard containers can be stacked on top of one another, depending upon the weight or thickness of the container material.

It is desirable to provide a re-usable shipping container which has the advantages of corrugated cardboard or paperboard containers, but which is constructed in a manner to facilitate reuse of the container a large number of times before it becomes necessary to dispose of the container.

SUMMARY OF THE INVENTION

It is an object of this invention to provide an improved shipping container.

It is another object of this invention to provide an improved re-usable shipping container.

It is an additional object of this invention to provide an improved re-usable shipping container made of corrugated plastic material.

It is a further object of this invention to provide a reusable corrugated plastic shipping container constructed with integral flexible hinges to permit it to be folded into a compact package for storage between uses.

In accordance with a preferred embodiment of this invention, the wall panels for a corrugated plastic shipping container are made in the form of rectangular panels, including first and second end panels and two pairs of side panels comprising first, second, third and fourth side panels. The corrugations of the plastic corrugated material forming the panels extend vertically when the panels are assembled for use. The various panels are interconnected by means of lighter-weight corrugated plastic hinge members which are heat bonded to the side and end panels, with the corrugations of the hinge members extending perpendicular to those of the container panels. The panels of the side panel pairs each are constructed to have a length which is less than the length of the end panels. The flexible hinge members, which interconnect all of the various panels together, permit the side panels to be folded inwardly to overlie one another between the first and second end panels in a storage position.

BRIEF DESCRIPTION OF THE DRAWINGS

FIG. 1 is a perspective view of a preferred embodiment of the invention;

FIG. 2 is a cross-sectional, enlarged detail taken along the line 2—2 of FIG. 1;

FIG. 3 is an enlarged cross-sectional view of the portion circled in FIG. 2;

FIGS. 4A through 4C constitute sequential diagrammatic representations illustrative of a feature of the invention; and FIG. 5 is an end view of the embodiment shown in FIG. 1 in a storage position.

DETAILED DESCRIPTION

Reference now should be made to the drawing in which the same reference numbers are used throughout the different figures to designate the same components. FIG. 1 is a top perspective view of a container 10 made in accordance with a preferred embodiment of the invention. The container 10 includes an open-topped, tray-like base 12, which may be made of any suitable material. For some applications, this material may comprise a relatively heavy grade of corrugated plastic, with short upstanding side walls. A cap 14, constructed in a manner similar to the base 12, covers the top of the container.

The side walls of the re-usable container illustrated in FIG. 1 are constructed in accordance with a preferred embodiment of the invention. These side walls include two identical rectangular end panels 20 and 21 and four identical side panels 22, 24, 25 and 26. All of the side panels are rectangular, as are the end panels 20 and 21. The length (horizontally) of each of the side panels 22, 24, 25 and 26 is selected to be less than the horizontal length or width of the end panels 20 and 21 for reasons which become more apparent in the subsequent description.

None of the panels 20, 21, 22, 24, 25 and 26 are rigidly connected together to form the sides of the box shown in FIG. 1. Instead, flexible web hinges 30 are used to interconnect the first and second upright edges of the end panels 20 and 21 to first edges, respectively, of the side panels 22 24, 25 and 26. Similarly, the second edges of the side panels 22 and 24 are interconnected with a flexible web hinge 35, as are the second edges of the side panels 25 and 26.

Ideally, the material which is used for the panels 20, 21, 22, 24, 25 and 26, as well as for the web hinges 30 and 35, is corrugated plastic material. As illustrated in detail in FIG. 2, the end panels and side panels actually each comprise inner and outer panels, such as the inner panel 20A and the outer panel 20B for the end 20, and the inner panel 22A and the outer panel 22B for the panel 22 shown in FIG. 1. For a relatively large shipping container, approximately 2 feet high by 3 feet wide by 4 feet long, the corrugated inner and outer panels comprising the end and side panels of the container, are made of corrugated plastic from 4 Mil to 16 Mil thickness, with the corrugations extending vertically, as illustrated in FIG. 1. The weight of the plastic typically varies from 185 pounds to 500 pounds per MSF. This provides the greatest strength for weight which may be placed on top of the lid 14 of the container when it is in its assembled position.

As illustrated in FIGS. 2 and 3, the corner web hinges 30 and side panel web hinges 35 also are made of corrugated plastic material These web hinges are arranged with the corrugations running horizontally, or perpendicular to the corrugations of the panels 20 through 26, and are scored along score-lines 31 and 32 were they are sandwiched between the inner and outer panels, such as the panels 20A/20B and 22A/22B, as illustrated in FIG. 2. These score-lines 31 and 32 serve to facilitate in the folding or bending of the web hinges 30 and 35 to form the container 10 and to permit it to be collapsed to its storage position.

As shown most clearly in FIG. 2, the exposed portion of the hinges 30 (and, similarly, the hinges 35) between the ends of the inner and outer panel members sandwiching the hinges 30 between them spaces apart adjacent panels, such as the panels 20A and 22A of the corner shown in FIG. 2, or the panels 22B and 24B, to overlie one another when the container is stored, as described subsequently. This spacing also is apparent from an examination of the preferred embodiment in FIG. 1.

The sandwich of the inner and outer panels and the web hinges is effected by thermal pressure bonding or any other suitable means, to cause the structure to be permanently interconnected. This bonding is indicated by the points 38 illustrated in FIG. 1, and is accomplished on both sides of the sandwich for the entire vertical height of the end and side panels, at each of the points where the web hinges 30 and 35 are used to interconnected adjacent end and side panels of the device.

When the container is in its assembled shipping position, as shown in FIGS. 1 and 4A, an inner frame may be placed around the inner edge of the container to hold the panels in the hollow, rectangular box-like configuration which is shown in these figures. When the container is to be stored, or is to be "flattened" for return to the original location; so that it can be used again, the end and side panel portion of the container is either lifted out of the base 12, or any retaining means provided in the base to hold the container in the shape shown in FIGS. 1 and 4A, is removed. Pressure then is applied at the hinge points 35 on each side of the container to cause the container to fold inwardly, as illustrated in FIG. 4B. Once the sides 22, 24, 25 and 26 are folded inwardly, as illustrated in FIG. 4B, pressure is applied to the ends 20 and 21 to complete the collapse of the container. The folded container then is laid on one of the ends 20 or 21 within the base 12, as illustrated in FIG. 5.

The base 12, for at least some applications, also may be nested inside the cover 14, as illustrated. Suitable fasteners are used to hold the assembly together, and it is readily apparent that the amount of space which is required for storage and return of the container is significantly less than if the container were to be left in its full expanded size, as shown in FIG. 1. A large number of collapsed containers may be shipped back to a point of origin where they are again filled with material to be transported. To reassemble the container, the process shown in FIGS. 4A through 4C is reversed to bring the container back into the configuration shown in FIG. 1.

It should be noted that the collapsing of the container in the manner illustrated in FIGS. 4A through 4C always is accomplished when the pairs of panels 22/24 and 25/26 are identical to one another, and when the overall horizontal length of each of these panels is less than the length, horizontally, of the end panels 20 and 21. Typically, the panels 22, 24, 25 and 26 all are rectangles of the same size; so that the hinges 35 are located in the center of the side walls of the container.

Although the invention has described in conjunction with the utilization of corrugated plastic as the preferred structural material, other structural materials could be used for the container if desired. The technique which is employed for assembling and dis-assembling the container is the same, irrespective of the type of material used. Corrugated plastic, however, is desirable since it is capable of many re-uses. The manner of connecting the panels together may be varied, the hinge material may be varied, and other modifications will occur to those skilled in the art, without departing from the true scope of the invention as defined in the appended claims.

I claim:

1. A shipping container member including in combination:

sidewall panels for vertical orientation about an article to be shipped, comprising first and second end panels, each having a first predetermined length, and first, second, third and fourth side panels, said side panels each having a length less than said first predetermined length, with the combined length of said first and second side panels being equal to the combined length of said third and fourth side panels; and flexible hinge means made of corrugated material and folded perpendicular to the corrugations thereof for interconnecting said first end panel with said first and third side panels, said second end panel with said second and fourth side panels, said first side panel with said second side panel, and said third side panel with said fourth side panel to permit said first, second, third and fourth side panels to fold inwardly to overlie one another between said first and second end panels in a storage position of such container member, said hinge means being bonded to said panels.

2. The combination according to claim 1 wherein said end and side sidewall panels all are rectangular in shape.

3. The combination according to claim 2 wherein said first and second end panels and said first, second, third and fourth side panels are made of corrugated material, the corrugations of which are parallel to the first and second edges thereof.

4. The combination according to claim 3 wherein said first and second end panels and said first, second, third and fourth side panels are made of plastic corrugated material.

5. The combination according to claim 4 wherein all of said end panels and said side panels have the same vertical height.

6. The combination according to claim 5 wherein the first and second end panels and said first, second, third and fourth side panels each have first and second edges; and the first and second edges of said first end panel are interconnected by said flexible hinge means with the first edges, respectively, of said first and third side panels; the first and second edges of said second end panel are connected by said flexible hinge means, respectively, with the first edges of said second and fourth side panels, the second edge of said first side panel and the second edge of said second side panel are interconnected by said flexible hinge means, and the second edge of said third side panel and the second edge of said fourth side panel are connected by said flexible hinge means.

7. The combination according to claim 6 wherein said corrugated material hinge means extend throughout the full length of the first and second edges of said end panels and said side panels.

8. The combination according to claim 7 wherein said hinge means is attached to the respective panels in a manner to space said panels apart a sufficient amount to permit inward folding of said side panels to overlie one another between said first and second end panels.

9. The combination according to claim 8 further including score-lines in the material of each of said hinge means adjacent the edges of said panels to which said hinge means are attached, for facilitating the inward folding of said side panels to said storage position.

10. The combination according to claim 9 wherein said end panels and said first, second, third and fourth side panels each comprise separate identically-shaped inner and outer panel members made of corrugated material, with said hinge means extending between said inner and outer panels, and bonded thereto in a sandwich construction.

11. The combination according to claim 10 wherein said first and second end panels and said first, second, third and fourth side panels are made of plastic corrugated material predetermined thickness, and said hinge means are made of plastic corrugated material, having a thickness less than said predetermined thickness.

12. The combination according to claim 11 wherein said first second, third and fourth side panels all have the same length.

13. The combination according to claim 1 wherein said first and second end panels and said first, second, third and fourth side panels are made of corrugated material, the corrugations of which are parallel to the first and second edges thereof.

14. The combination according to claim 1 wherein said first, second, third and fourth side panels all have the same length.

15. The combination according to claim 1 wherein all of said end panels and said side panels have the same vertical height.

16. A shipping container member including in combination:

sidewall panels for vertical orientation about an article to be shipped, comprising first and second end panels, each having a first predetermined length, and first, second, third and fourth side panels, said side panels each having a length less than said first predetermined length, with the combined length of said first and second side panels being equal to the combined length of said third and fourth side panels; and flexible hinge means made of corrugated material interconnecting said first end panel with said first and third side panels, said second end panel with said second and fourth side panels, said first side panel with said second side panel, and said third side panel with said fourth side panel to permit said first, second, third and fourth side panels to fold inwardly to overlie one another between said first and second end panels in a storage position of such container member, said first and second end panels and said first, second, third and fourth side panels each have first and second edges; and the first and second edges of said first end panel are interconnected by said flexible hinge means with the first edges, respectively, of said first and third sided panels; the first and second edges of said second end panel are connected by said flexible hinge means, respectively, with the first edges of said second and fourth side panels, the second edge of said first side panel and the second edge of said second side panel are interconnected by said flexible hinge means, and the second edge of said third side panel and the second edge of said fourth side panel are connected by said flexible hinge means, with said flexible hinge means bonded to said respective panels with the corrugations of said hinge means extending perpendicular to the first and second edges of said panels.

17. The combination according to claim 16 wherein said corrugated material hinge means extend throughout the full length of the first and second edges of said edge panels and said side panels.

18. The combination according to claim 17 wherein said hinge means is attached to the respective panels in a manner to space said panels apart a sufficient amount to permit inward folding of said side panels to overlie one another between said first and second end panels.

19. The combination according to claim 18 further including score-lines in the material of each of said hinge means adjacent the edges of said panels to which said hinge means are attached, for facilitating the inward folding of said side panels to said storage position.

20. The combination according to claim 19 wherein said first and second end panels and said first, second third and fourth side panels are made of plastic corrugated material.

* * * * *